(12) United States Patent
Rangaswamy et al.

(10) Patent No.: US 9,932,456 B2
(45) Date of Patent: Apr. 3, 2018

(54) PROCESS FOR RECOVERING POLYESTER FROM POLYESTER/WOOL BLEND

(71) Applicant: RELIANCE INDUSTRIES LIMITED, Mumbai (IN)

(72) Inventors: Vidhya Rangaswamy, Thane (IN); Anurag Srivastava, Mumbai (IN); Vijai Balachandran, Vellore (IN); Harshvardhan Joshi, Gwalior (IN)

(73) Assignee: Reliance Industries Limited, Mumbai (IN)

( * ) Notice: Subject to any disclaimer, the term of this patent is extended or adjusted under 35 U.S.C. 154(b) by 0 days.

(21) Appl. No.: 15/102,004

(22) PCT Filed: Jan. 6, 2015

(86) PCT No.: PCT/IB2015/050081
§ 371 (c)(1),
(2) Date: Jun. 6, 2016

(87) PCT Pub. No.: WO2015/101960
PCT Pub. Date: Jul. 9, 2015

(65) Prior Publication Data
US 2016/0304694 A1 Oct. 20, 2016

(30) Foreign Application Priority Data
Jan. 6, 2014 (IN) .......................... 4133/MUM/2013

(51) Int. Cl.
*C08J 11/04* (2006.01)
*C08J 11/10* (2006.01)
*D06M 16/00* (2006.01)
*C08J 11/14* (2006.01)
*C08J 11/16* (2006.01)

(52) U.S. Cl.
CPC ............. *C08J 11/105* (2013.01); *C08J 11/04* (2013.01); *C08J 11/14* (2013.01); *C08J 11/16* (2013.01); *D06M 16/003* (2013.01); *C08J 2367/02* (2013.01); *C08J 2401/02* (2013.01); *C08J 2401/24* (2013.01); *Y02P 20/143* (2015.11); *Y02W 30/70* (2015.05)

(58) Field of Classification Search
None
See application file for complete search history.

(56) References Cited

U.S. PATENT DOCUMENTS

| 3,937,671 | A | * | 2/1976 | Gruntfest | ................ | C08J 11/04 |
| | | | | | | 521/48 |
| 9,222,216 | B2 | * | 12/2015 | Mukhopadhyay | .. | D06M 16/003 |
| 2016/0311997 | A1 | * | 10/2016 | Rangaswamy | .......... | C08J 11/04 |

FOREIGN PATENT DOCUMENTS

JP    2000 344933 A    * 12/2000

OTHER PUBLICATIONS

Serod, J et al. Multicomponent Textile Blend Recycling. AUTEX World Textile Conference Dresden Germany, May 22-24, 2013, pp. 1-6.*
Wavhal S. et al. Role of Biotechnology in the Treatment of Polyester Fabric. Indian J Microbiol 51(2)117-123, Apr./Jun. 2011.*
Monier M. et al. Immobilization of Candida rugosa Lipase on Modified Natural Wool Fibers. Reactive & Functional Polymers 70:122-128, 2010.*
Harris M. Effect of Alkalies on Wool. J Research National Bureau of Standards, pp. 63-71, Jul. 1935.*

* cited by examiner

*Primary Examiner* — Ralph J Gitomer
(74) *Attorney, Agent, or Firm* — Ladas & Perry LLP

(57) ABSTRACT

The present disclosure relates to a process for recovering a polyester component and products of a non-polyester component from a fabric containing a polyester blend. The polyester component of the present disclosure is polyethylene terephthalate and the non-polyester component is wool. The process includes hydrolyzing the article using at least one hydrolyzing agent to convert the non-polyester component into products of the non-polyester component and release the polyester component.

10 Claims, 3 Drawing Sheets

PROCESS FOR RECOVERING POLYESTER FROM POLYESTER/WOOL BLEND

RELATED APPLICATION INFORMATION

This application is a 371 of International Application PCT/IB2015/050081 filed 6 Jan. 2015, which claims priority from India Application No: 4133/MUM/2013 filed 6 Jan. 2014, the content of which is incorporated herein by reference.

This application is a National Stage application filed under Rule 371 based on PCT/IB2015/050081 filed on Jan. 6, 2015, which claims priority to Indian patent application.

FIELD

The present disclosure relates to a process for recovering polyester. Particularly, the present disclosure relates to a process for recovering polyester component and products of non-polyester component from an article comprising a polyester/wool blend.

BACKGROUND

Polyesters and its blends with various substances such as wool and silk find applications in various articles such as apparel, home furnishings, upholstery, containers, carpets and the like owing to their flexibility and a range of desirable properties.

Waste or used polyester is either burned or buried in landfills. These methods, although common in practice, are immensely detrimental to the environment. This is because the microorganisms present in the soil are unable to degrade the polyester which causes its accumulation in the soil. Such accumulated polyester mars the growth and development of the flora and fauna present in the sub-soil environment thereby disturbing the ecological balance.

Attempts have been made by the scientific community to tackle the afore-stated dilemma. The conventional methods, however, are associated with certain drawbacks such as use of expensive hydrolyzing agents and complex methods which render the process of recycling cumbersome. Therefore, there exists a need to provide a simple and effective process which facilitates easy separation of the polyester from the blend and which renders the polyester and the other hydrolysis products suitable for recycling or reuse.

OBJECTS

Some of the objects of the present disclosure, which at least one embodiment is able to achieve, are discussed herein below.

It is an object of the present disclosure to provide a process for recovering polyester component and products of non-polyester component from an article comprising a polyester blend.

It is another object of the present disclosure to provide a process for recovering polyester component and products of non-polyester component from an article comprising a polyester blend, which precludes the environmental hazards associated with the disposal of polyester products.

It is yet another object of the present disclosure to provide a process for recovering polyester component and products of non-polyester component from an article comprising a polyester blend which is simple and devoid of complex process steps.

It is further an object of the present disclosure to provide a process for recovering polyester component from an article comprising a polyester/wool blend.

It is still another object of the present disclosure to ameliorate one or more problems of the prior art or to at least provide a useful alternative.

Other objects and advantages of the present disclosure will be more apparent from the following description and accompanying drawings which is not intended to limit the scope of the present disclosure.

SUMMARY

The present disclosure provides a process for recovering a polyester component and products of a non-polyester component from an article comprising a polyester blend. Typically, the polyester blend comprises a polyester component and a non-polyester component; the polyester component being polyethylene terephthalate (PET) and the non-polyester component being wool. The process comprises hydrolyzing the article using at least one hydrolyzing agent having pH ranging from 7 to 14 to convert said non-polyester component into products of the non-polyester component; thereby releasing the polyester component. The step of hydrolyzing the article is carried out at a temperature ranging from 90 to 160° C. for a time period ranging from 10 to 90 minutes and at a pressure ranging from 5 to 25 psi.

BRIEF DESCRIPTION OF THE DRAWINGS

The disclosure will now be described with reference to accompanying non-limiting drawings, wherein:

FIG. 1 illustrates Scanning Electron Microscopy (SEM) images of PET/Wool (75:25) fabric blend after undergoing the process as disclosed in Example 1, wherein FIG. 1A represents Control PET/Wool (untreated), wherein:
(a) represents polyester; and
(b) represents wool;

FIG. 1B represents PET/Wool after treatment with alkali, protease and lipase; and FIG. 1C represents PET/Wool after treatment with 4% NaOH.

FIG. 2 illustrates Scanning Electron Microscopy (SEM) images of PET/Wool (75:25) fabric blend after undergoing the process as disclosed in Example 2, wherein FIG. 2A represents PET/Wool fabric after treatment with 0.5% (w/v) calcium carbonate, wherein:
(a) represents polyester; and
(b) represents wool;

FIG. 2B represents PET/Wool fabric after treatment with 0.5% (w/v) sodium carbonate;

FIG. 2C represents PET/Wool fabric after treatment with 0.5% (w/v) calcium hydroxide; and FIG. 2D represents PET/Wool fabric after treatment with 0.5% (w/v) sodium hydroxide.

FIG. 3 illustrates Scanning Electron Microscopy (SEM) images of PET/Wool (75:25) fabric blend after undergoing the process as disclosed in Example 3, wherein FIG. 3A represents Control PET/Wool (untreated), wherein:
(a) represents polyester; and
(b) represents wool;

FIG. 3B represents PET/Wool fabric after treatment with 0.5% (w/v) sodium carbonate;

FIG. 3C represents PET/Wool fabric after treatment with 1.0% (w/v) sodium carbonate;

FIG. 3D represents PET/Wool fabric after treatment with 2.0% (w/v) sodium carbonate;

FIG. 3E represents PET/Wool fabric after treatment with 3.0% (w/v) sodium carbonate; and FIG. 3F represents PET/Wool fabric after treatment with 4.0% (w/v) sodium carbonate.

DETAILED DESCRIPTION

Figure 1:
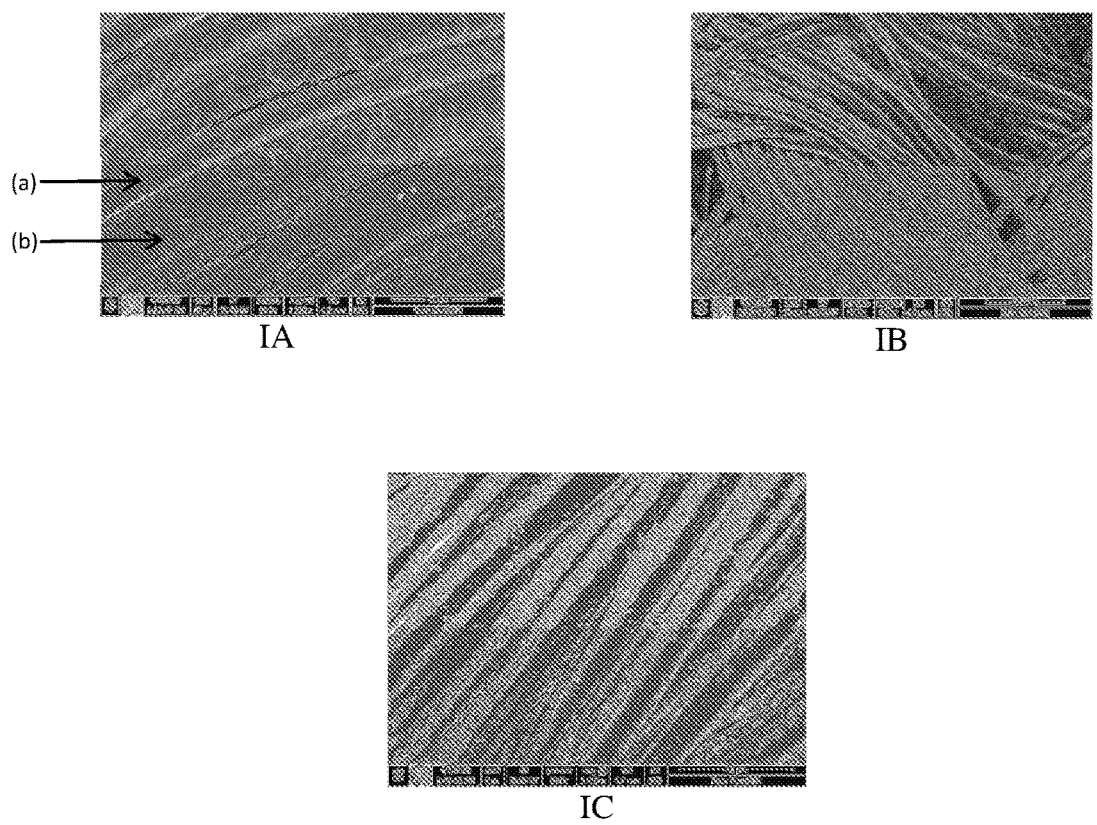

Production, distribution and consumption of polyester and polyester blends has increased significantly over the years. This has, however, consequently aggravated the problem of their waste disposal. The inventors of the present disclosure have developed a process for the recovery and reuse of polyester and non-polyester components from used or waste article containing polyester blends so that the necessity of their disposal in the environment is eliminated. For the purpose of the present disclosure, the term 'article' besides having its standard meaning, includes any product made up of a polyester/wool blend and is selected from the group consisting of apparel, home furnishings, upholstery, containers, carpets, tubes, stripes and pipes.

In accordance with the process of the present disclosure, the polyester blend is composed of a polyester component and a non-polyester component. Typically, the polyester component is polyethylene terephthalate (PET) and the non-polyester component is wool. The article, before initiating the process described herein below, is optionally subjected to shredding.

In accordance with the present process, the article is hydrolyzed at pre-determined temperature, pressure and time duration using at least one hydrolyzing agent having pH ranging from 7 to 14 to convert the non-polyester component into its products; thereby causing release of the polyester component. The pre-determined temperature ranges from 90 to 160° C., the time period for hydrolysis ranges from 10 to 90 minutes and the pre-determined pressure ranges from 5 to 25 psi. The hydrolyzing agent used in the present disclosure includes at least one alkali selected from the group consisting of sodium hydroxide, sodium carbonate, calcium hydroxide and calcium carbonate and has concentration ranging from 3 to 5%. In one embodiment, the process of hydrolyzing is carried out in an autoclave. After hydrolysis, the products formed are optionally neutralized to wash off the hydrolyzing agent.

After alkali hydrolysis, the article may optionally be subjected to enzyme treatment to convert the non-polyester component into its products to further separate the polyester and the non-polyester components. Typically, the enzyme treatment encompasses incubating with at least one enzyme selected from the group consisting of lipase and protease in the presence of a buffer such as sodium phosphate. Typically, the strength of the buffer ranges from 80 to 120 mM and has pH ranging from 6.0 to 8.0. Furthermore, the step of incubating is carried out for a time period ranging from 15 to 48 hours at a temperature ranging from 40 to 60° C. and is accompanied by stirring at a speed ranging from 150 to 250 rpm. In accordance with the present process, the enzyme is a combination of lipase and protease. Furthermore, the enzyme has a concentration ranging from 1 to 10 g/L. Incubation with the afore-stated enzyme(s) results in further separation of the polyester component from the non-polyester component and the, thus, separated components are recovered.

The term 'products of the non-polyester component' includes the products or fragments of the non-polyester component obtained or left behind after the steps of alkali hydrolysis and/or enzyme treatment. In one embodiment, 'products of the non-polyester component' are the disintegration products of the non-polyester component.

A characteristic feature of the embodiment where the step of enzyme treatment is carried out, is that separation of the non-polyester component from the polyester component is achieved twice, first chemically during the hydrolysis step and second biologically using the enzyme(s). This causes effective separation and maximum recovery of both the components.

The present disclosure will now be discussed in the light of the following non-limiting embodiments:

PET/Wool (75:25) blended fabric was tested for the recovery of its polyester and non-polyester components in accordance with the process of the present disclosure. The process was optimized as follows.

Example 1: Enzymatic Hydrolysis of PET/Wool (75:25)

Sample: PET/Wool (75:25)

A number of hydrolysis trials were conducted on PET/Wool (75:25) fabric to achieve the separation of PET and wool. These trials and the results obtained are presented herein below in Table 1.

In the trial where alkali hydrolysis was tested, PET/Wool (75:25) was hydrolyzed by autoclaving with 4% NaOH at 121° C. for 15 minutes. In another trial, PET/Wool (75:25) was incubated, without treatment with alkali, at 50° C. using protease (Papain, SRL ltd) followed by lipase (Sigma Aldrich) in the presence of 100 mM Na-phosphate buffer of pH 7.0. Here, 0.1 g of sample was taken per 40 ml of the buffer. The incubation time for protease treatment was 16 hours and for lipase was 48 hours. The concentration of both the enzymes was of 5 g/L.

The results (Table 1) and the Scanning Electron Microscopy (SEM) images (FIG. 1) indicate that:

alkali treatment alone is enough to remove the wool from the blend; and use of enzymes alone without alkali treatment is not effective in hydrolyzing wool from PET/Wool This is derived from the fact that in FIGS. 1B (blend after treatment with alkali and enzymes) and 1C (after treatment with alkali alone), PET fiber alone is visible while wool has been completely removed.

TABLE 1

Enzymatic hydrolysis of PET/Wool (75:25)

| Fabric | Treatment | Weight loss (%) |
|---|---|---|
| PET/Wool | Autoclaving in 4% NaOH + Lipase | 41.6 |
| PET/Wool | Autoclaving in 4% NaOH + Protease + Lipase | 46.0 |
| PET/Wool | Lipase alone | 4.0 |
| PET/Wool | Autoclaving in 4% NaOH + Protease | 51.40 |
| PET/Wool | Protease alone | 3.80 |
| PET/Wool | Only autoclaving in 4% NaOH | 46.20 |

Example 2: Effect of Different Alkalis

Sample: PET/Wool (75:25) Fabric

PET/wool fabric blend (75:25) samples weighing 0.5 g were pretreated with different alkalis such as 0.5% (w/v) of sodium carbonate, 0.5% (w/v) sodium hydroxide, 0.5% (w/v) calcium carbonate and 0.5% (w/v) calcium hydroxide. Fabric loading for the experiment was 1.25% (w/v) and the samples were autoclaved in the alkali at 121° C. for 15 minutes. Post autoclaving, the fabric samples were rinsed thoroughly to remove the alkali traces and dried to record the weight loss.

Figure 2:
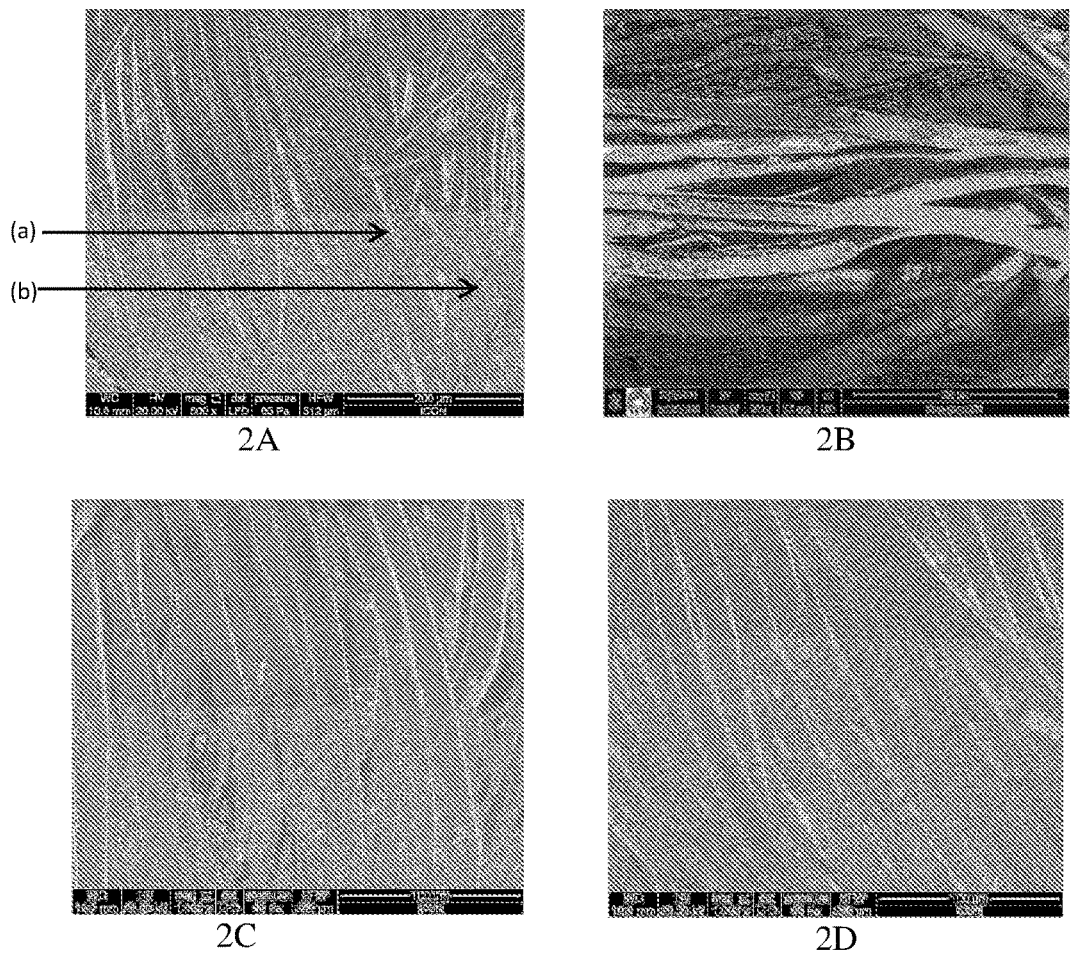

It was observed that 0.5% $CaCO_3$ was unable to separate wool from PET (FIG. 2A). Similarly, traces of wool fiber were seen after treatment with 0.5% $Na_2CO_3$ (FIG. 2B). Complete wool removal was observed after treatment with 0.5% $Ca(OH)_2$ (FIG. 2C) and 0.5% NaOH (FIG. 2D).

The results (Table 2) and Scanning Electron Microscopy (SEM) images (FIG. 2) indicate that:
Alkali treatment alone is enough to remove the wool from the blend in all cases except $CaCO_3$
Treatment with 0.5% $CaCO_3$ alone does not have any effect on wool removal.

TABLE 2

Treatment of PET/wool (75:25) with different alkalis

| Alkali variety | Wt. loss % |
|---|---|
| $CaCO_3$ (FIG. 2A) | Nil |
| $Ca(OH)_2$ (FIG. 2C) | 30 |
| $Na_2CO_3$ (FIG. 2B) | 27 |
| NaOH (FIG. 2D) | 30 |

NaOH and $Ca(OH)_2$ being more hazardous from the point of view of the environment, $Na_2CO_3$ was considered as the alkali of choice for process optimization as it gave results similar to those of NaOH and $Ca(OH)_2$.

Example 3: Process Optimization—Alkali Concentration

Sample: PET/Wool (75:25)

PET/wool fabric (75:25) was pretreated with $Na_2CO_3$ having different concentrations (0-4%) with a fabric loading of 1.25% (w/v)—pretreatment was done with 40 ml $Na_2CO_3$ and 0.5 g of fabric sample. Autoclaving was done at 121° C. for 15 min Post autoclaving, the fabric samples were rinsed thoroughly to remove the alkali traces and dried to record the weight loss.

Figure 3:
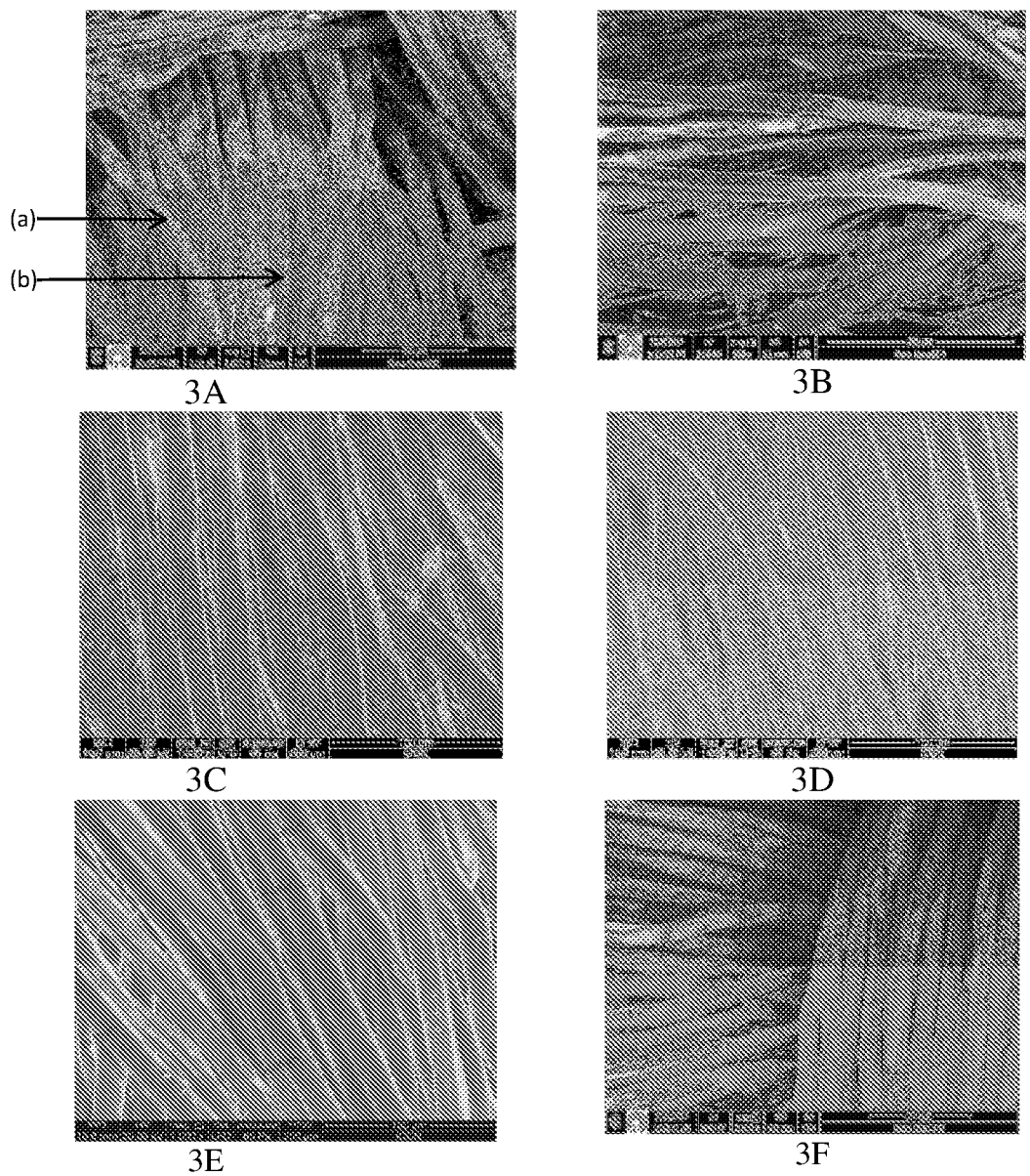

From the results (Table 3) and the SEM images (FIG. 3) it was clear that $Na_2CO_3$ treatment at 1% and above concentrations leads to complete removal of wool. No weight loss was recorded in untreated fabric samples.

TABLE 3

Optimization of $Na_2CO_3$ concentration

| $Na_2CO_3$ conc. (%) | Wt. loss % |
|---|---|
| 0.0 (FIG. 3A) | Nil |
| 0.5 (FIG. 3B) | 27 |
| 1.0 (FIG. 3C) | 28 |
| 2.0 (FIG. 3D) | 30 |
| 3.0 (FIG. 3E) | 30 |
| 4.0 (FIG. 3F) | 30 |

The embodiments herein and the various features and advantageous details thereof are explained with reference to the non-limiting embodiments in the description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Technical Advantages and Economic Significance

The process disclosed in the present disclosure facilitates recovery and recycling of polyester with high recovery rate.

The process of the present disclosure provides a means of disposal of waste polyester which is not harmful to the environment.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

The numerical values given for various physical parameters, dimensions and quantities are only approximate values and it is envisaged that the values higher than the numerical value assigned to the physical parameters, dimensions and quantities fall within the scope of the invention and the claims unless there is a statement in the specification to the contrary.

While certain embodiments of the inventions have been described, these embodiments have been presented by way of example only, and are not intended to limit the scope of the inventions. Variations or modifications in the process or compound or formulation or combination of this invention, within the scope of the invention, may occur to those skilled in the art upon reviewing the disclosure herein. Such variations or modifications are well within the spirit of this invention. The accompanying claims and their equivalents are intended to cover such forms or modifications as would fall within the scope and spirit of the invention.

The invention claimed is:

1. A process for recovering, from an article comprising a polyester blend comprising a polyester component and a non-polyester component, the polyester component and products of the non-polyester component wherein said non-polyester component is wool; said process comprising hydrolyzing said article using at least one hydrolyzing agent having pH ranging from 7 to 14 to convert said non-polyester component into products of the non-polyester component, followed by washing to remove said alkali and said products of said non-polyester component and drying to recover the polyester component wherein said hydrolyzing agent is an alkali; and wherein, said alkali has a concentration ranging from 3 to 5% (w/v).

2. The process as claimed in claim 1, wherein said polyester component is polyethylene terephthalate (PET).

3. The process as claimed in claim 1, wherein said step of hydrolyzing said article includes a pre-step of shredding said article.

4. The process as claimed in claim 1, wherein said step of hydrolyzing said article is carried out at a temperature ranging from 90 to 160° C. for a time period ranging from 10 to 90 minutes and at a pressure ranging from 5 to 25 psi.

5. The process as claimed in claim 1, wherein said step of hydrolyzing said article is carried out in an autoclave.

6. The process as claimed in claim 1, wherein one alkali is selected from the group consisting of sodium hydroxide, sodium carbonate, calcium hydroxide and calcium carbonate.

7. The process as claimed in claim 1, further includes incubating the article, after the step of hydrolyzing, with at least one enzyme selected from the group consisting of lipase and protease to further separate and recover the polyester component and the non-polyester component.

8. The process as claimed in claim 7, wherein said step of incubating is carried out in the presence of a buffer having strength ranging from 80 to 120 mM and pH ranging from 6.0 to 8.0 for an incubation period ranging from 15 to 48 hours at a temperature ranging from 40 to 60° C.; said buffer being sodium phosphate.

9. The process as claimed in claim 7, wherein said step of incubating includes stirring at a speed ranging from 150 to 250 rpm.

10. The process as claimed in claim 7, wherein said enzyme is a combination of lipase and protease and has a concentration ranging from 1 to 10 g/L.

* * * * *